United States Patent [19]

Schwab et al.

[11] Patent Number: 4,689,623
[45] Date of Patent: Aug. 25, 1987

[54] MONOPULSE PROCESSING SYSTEMS

[75] Inventors: Carl Schwab, Huntington Station; Oliver C. Odegaard, Smithtown; Wassil D. Tussosov, New York, all of N.Y.

[73] Assignee: ISC Cardion Electronics Corporation, Woodbury, N.Y.

[21] Appl. No.: 837,238

[22] Filed: Mar. 7, 1986

[51] Int. Cl.[4] .............................................. G01S 13/76
[52] U.S. Cl. ...................................... 342/39; 342/152
[58] Field of Search .................................. 342/37–40, 342/149, 152, 194

[56] References Cited

U.S. PATENT DOCUMENTS

| 3,212,089 | 10/1965 | Longacre et al. | 342/149 |
| 3,890,617 | 6/1975 | Moulton | 342/149 X |
| 4,103,300 | 7/1978 | Gendreu et al. | 342/149 X |
| 4,316,190 | 2/1982 | Cole | 342/39 |
| 4,334,224 | 6/1982 | Gordon | 342/37 |

OTHER PUBLICATIONS

F.A.A. Report No. FAA-RD-79-111; (No date, pp. 19–23, LaFrey et al.).
M. Skolnik, Radar Handbook, pp. 21-28 through 21-30; (McGraw-Hill, 1970).
M. Skolnik, Intro. to Radar Systems, pp. 160–167; (McGraw-Hill, 1980).
"Surveillance Perform. Measurements of the SSR Mode of the Discrete Address Beacon System" (Orlando et al.; M.I.T. Lincoln Lab; no date).

Primary Examiner—T. H. Tubbesing
Assistant Examiner—Bernarr Earl Gregory
Attorney, Agent, or Firm—John F. Ohlandt

[57] ABSTRACT

A secondary surveillance radar system in which monopulse processing is used to obtain angle estimation of azimuth bearing, involving a monopulse processor, two independent phase detectors in respective A and B channels, the arrangement being such that a log amplifier is provided in each of the respective channels and the outputs of these log amplifiers are coupled to the independent phase detectors, whereby a resultant signal is obtained giving target deviation from boresight in either direction based on differences in phase between signals appearing in the respective channels.

6 Claims, 3 Drawing Figures

MONOPULSE PROCESSING SYSTEMS

BACKGROUND OF THE INVENTION

1. Field of the Invention

This invention relates to the field of secondary surveillance radar (SSR) systems, which are systems designed to operate in conjunction with primary radar systems for precisely locating aircraft by transmitting information to them and processing their replies. More particularly, this invention relates to an SSR system in which monopulse processing is used to obtain angle estimation of azimuth bearing of aircraft.

By monopulse processing is meant techniques which determine aircraft azimuth on a pulse-by-pulse basis so as to permit highly accurate azimuth estimates to be made on a single reply per scan. Such techniques permit a very high degree of accuracy in determining azimuth. Moreover, monopulse techniques permit secondary surveillance radar (SSR) operation at a greatly reduced pulse repetition frequency compared to that required by more conventional azimuth measurement techniques.

2. Background Information

For a general description of a secondary surveillance radar system, reference may be made to a report entitled "Surveillance Performance Measurements of the SSR Mode of the Discrete Address Beacon System" by Vincent A. Orlando and Paul R. Drouilhet, MIT Lincoln Laboratory. That reference describes a system involving the use of a multibeam antenna, and the target off-boresight azimuth is determined by the relative magnitude of the received signal strength in the Difference ($\Delta$) and Sum ($\Sigma$) channels of the system. In the particular context involved, boresight is defined as the precise angle at which the radio frequency antenna pattern is pointing at any instant.

A second system, which is known to the present inventors provides that the magnitudes or amplitudes of the signals in Difference ($\Delta$) and Sum ($\Sigma$) channels serve as a means of estimating how far the target return is off-boresight. Since the ratio of the Difference ($\Delta$) signal to the Sum ($\Sigma$) signal is the point of interest, it is convenient to deploy log amplifiers. However, if the signal magnitude only is being used, there is ambiguity as to whether the target is left or right of boresight. In the implementation shown in this second system, means are provided for resolving the ambiguity. Thus, samples of the carrier signal are taken from the Sum, ($\Sigma$) and Difference ($\Delta$) channels. These signals are then compared on a phase basis to determine whether the target is left or right. This second reference also describes a system in which a third channel, called the Omni ($\Omega$) or control channel, is similarly processed by deployment of a log amplifier. A signal is provided in this third channel to suitable components to indicate that the target is in the main beam of the antenna, rather than being a side or back lobe response which requires suppression.

The four signals involved in this second system, that is the Sum ($\Sigma$) video, the Difference ($\Delta$) video, sign, and control video are further processed to determine if the target return is indeed from the main beam and, if so, to estimate how far left or right it is from boresight. The circuitry of this particular system is straightforward, provided the log amplifiers are well matched, and further provided that the Difference ($\Delta$) amplitude stays well above thermal noise levels. In practice this is not achieved, particularly when one considers maximum range (the weakest signal returns) and targets on or near boresight. Under the latter conditions, the Difference ($\Delta$) signal will be perhaps 20–30 db lower in magnitude than the Sum ($\Sigma$) signal.

A third system of particular interest to the present invention is that described in the report FAA-RD-79-111 entitled "The Transportable Measurements Facility (TMF) System Description" by R. R. La Frey et al. The system of this third reference operates in such a way that the Sum ($\Sigma$) and Difference ($\Delta$) channel outputs from the antenna are combined to produce two signals, i.e. $\Sigma + j\Delta$ and $\Delta + \Sigma$, which will always have the same magnitude but which will differ in angle depending on the value of the Difference ($\Delta$) signal.

The system of this third reference is sometimes referred to as a one-half angle monopulse processor. In such system, the combined signals $\Sigma + j\Delta$ and $\Delta + \Sigma$ are linearly amplified after mixing to produce an IF signal, typically having a frequency of 60 megahertz. At this point in such system, samples from these two channels are combined again to produce resultant signals, which are the Sum ($\Sigma$) and Difference ($\Delta$) signals. The Sum ($\Sigma$) term is again split and part is passed through a log amplifier, and part provides the reference for the one-half angle processor phase detectors. The inputs to the phase detectors are passed through limiters so that the amplitude outputs are functions of phase difference only. Each phase detector provides an independent measurement of one-half of the angle between the two channels; hence the name, one-half angle processor.

As was the case with the first two systems cited, an Omni ($\Omega$) or control channel is also provided, and its signal is mixed, filtered, and amplified by means of a log amplifier, the output signal thereof being compared with a log amplifier output from the Difference ($\Delta$) channel. The purpose of this arrangement is to provide a signal to the overall system indicating that the signal is indeed from the main beam, and not a side or back lobe response from the antenna.

It is apparent that the second system earlier described is less complex than the third system just described above. However, its performance is relatively poor and this largely comes about from the fact that the signals processed in the Sum ($\Sigma$) and Difference ($\Delta$) channels are greatly different in amplitude as the target varies left and right of boresight. Moreover, the Difference ($\Delta$) signal from the log amplifier will be immersed in the thermal noise level, particularly near boresight. This makes this particular system susceptible to sign errors when the angle of target deviation is near the boresight.

A further attribute of the third system described above is that the processor used to estimate the angle off-boresight in this case is much simpler than is the case in the first and second systems, since the circuit provides a signal whose amplitude is a function directly of off-boresight displacement.

It will thus be appreciated that although the three known systems already described have various merits and advantages, they do not provide an efficient, simple and cost effective SSR system.

Accordingly, it is a primary object of the present invention to provide such a system; more specifically, to provide the performance available from one-half angle processing without the expense entailed with separate linear and limiting amplifiers.

Another object is to avoid the need for a separate log amplifier to provide a log video Sum ($\Sigma$) signal.

Yet another object is to avoid the requirement for precise tracking of the log video characteristic. This is possible in the system of the invention because phase information alone is used for azimuth angle estimate.

A further object is to provide a system in which the $\Sigma + j\Delta$ and $\Delta + j\Sigma$ channels are each provided with a log amplifier. These log amplifiers enable, in combination with phase detectors in each of the channels, a determination of the azimuth angle estimate, while the log amplifiers operate at the same signal level independent of the target position in the main beam.

Yet a further object is to attain the simplicity of the amplitude processing technique that is inherent in the systems described in the first and second references previously noted, while attaining the superior performance inherent in the one-half angle processing signal described in the third reference noted.

SUMMARY OF THE INVENTION

The above and further objects are fulfilled and implemented by the several features of the present invention.

The primary feature of the invention resides in a secondary surveillance radar system in which monopulse processing is used to obtain angle estimation of target azimuth bearing, the improvement comprising a monopulse processor, two independent phase detectors for detecting signals in respective channels, means for coupling the outputs of the respective phase detectors to said processor; the system further comprising a log amplifier in each of the respective channels, and means for coupling the outputs of said log amplifiers to the phase detectors, whereby a resultant signal is obtained giving target deviation in either direction from boresight based on the phase difference between the Sum ($\Sigma$) and Difference ($\Delta$) channel signals.

A specific feature of the above described system is that the Sum ($\Sigma$) and Difference ($\Delta$) signals from the antenna are combined in a 90 degree four port network to produce A and B signals, the A signal being equal to $\Delta + j\Sigma$ and the B signal equal to ($\Sigma$) $+ j\Delta$. These two signals will have the same amplitude but will differ in phase, depending on the target deviation from boresight. In the system these two signals are further mixed, filtered, and then passed into respective log amplifiers. Each of these log amplifiers provides two signal outputs: a carrier sample output and a detected log video output whose amplitude is proportional to the log of the input signal amplitude. The carrier samples being processed are hard limited, then are passed through in-phase power dividers to provide isolation. They are thereafter combined in at least another 90 degree four-port network to provide a Sum ($\Sigma$) signal which serves as a reference signal. This Sum ($\Sigma$) reference, after further splitting for isolation and phase reference, drives two phase detectors that measure the phase difference between the two channels. The phase detectors have their outputs connected to a monopulse processor whose output provides two different signal formats. One of the formats is simply monopulse video, which is bi-polar having a sign sense, and representing deviation of the target from boresight. The second output is a digitized 8-bit digital word quantizing the same information.

In addition to the carrier sample outputs the two log amplifiers in the respective Sum ($\Sigma$) and Difference ($\Delta$) channels provide log video A and log video B output signals. These video signals are fed to a device such that they are averaged and combined with a squared sample of the monopulse video signal from the monopulse processor. The resultant signal from this device is compared with an output from a log amplifier in the Omni ($\Omega$) channel. The signal from this comparison is used to produce a signal which determines if the return was within the main beam or was not. In the latter case it is suppressed by suitable circuitry.

Other and further objects, advantages and features of the present invention will be understood by reference to the following specification in conjunction with the annexed drawing, wherein like parts have been given like numbers.

DESCRIPTION OF PREFERRED EMBODIMENT

Figure 1:
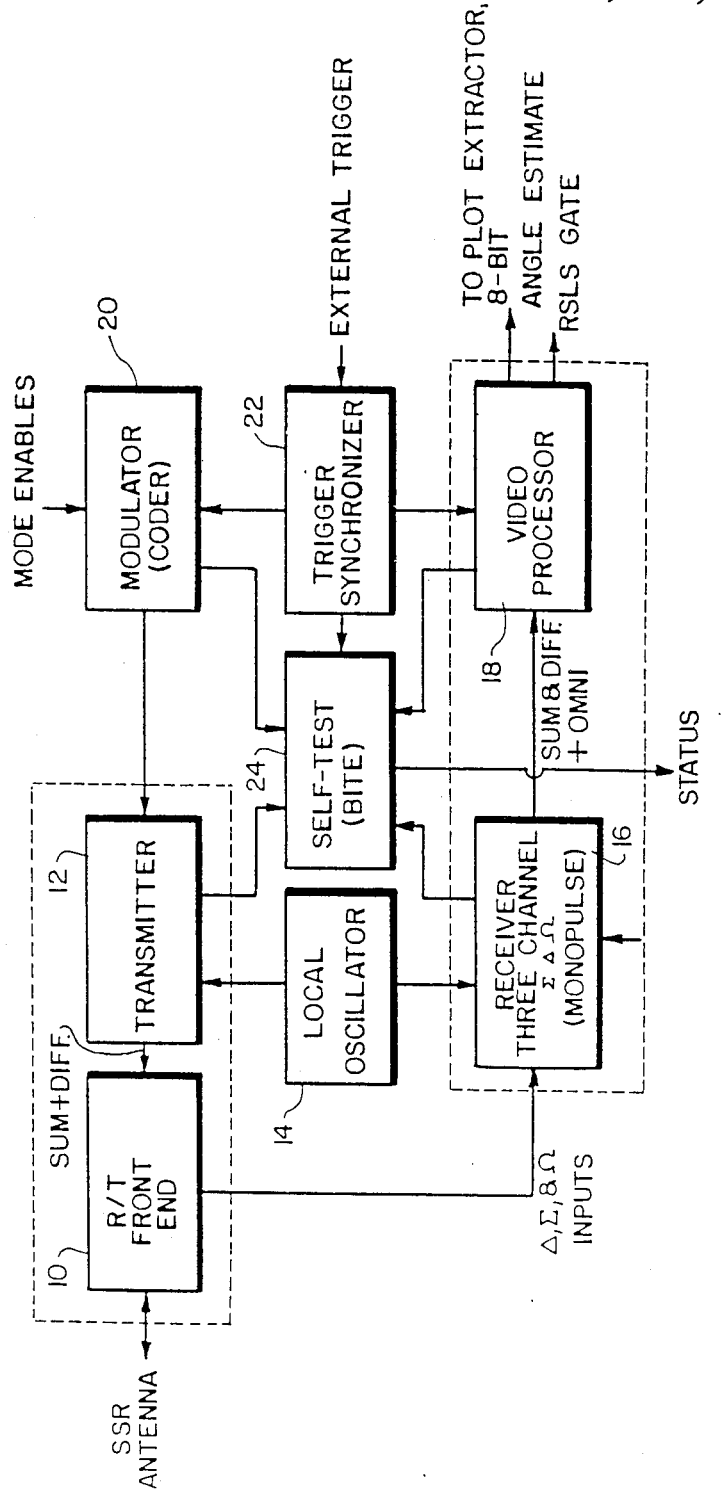
FIG. 1 is a block diagram of the context or environment in which the present invention functions. Such environment is an interrogator set which includes both a receiver and transmitter and suitable controls for operating same.

Referring now to the figures of the system and particularly for the moment to FIG. 1, there will be seen a simplified block or functional diagram of a so-called interrogator set comprising a receiver and transmitter front end 10, a dual function solid state transmitter 12, a local oscillator 14, and a three channel receiver 16 consisting of three identical monopulse receivers. Also included as part of this set is a video monopulse processor 18, a coder or modulator 20, an internal trigger synchronizer 22, and a self-test device 24.

The complete interrogator set generates and transmits two interrogation signals, the Sum ($\Sigma$) and the Omni ($\Omega$) signal. It receives three transponder reply signals, Sum ($\Sigma$), Difference ($\Delta$), and Omni ($\Omega$) as indicated at the input to the receiver transmitter 16. These three transponder replies are, of course, received from the aircraft whose location is being monitored.

It will be understood that the product of all the system functions is one digital word (seven bits plus sign) for angle estimate (off-boresight) and for the receiver side lobe suppression gate seen in the figure at the output of the video processor 18.

The interrogator set seen in FIG. 1 is, per se, well-known and it is a self-contained and powered unit for operation in single and dual channel SSR systems. Such an interrogator set normally operates in conjunction with the primary radar of the air traffic control facility, providing identification information and altitude position of aircraft equipped with appropriate transponders. Interrogations are made on a crystal controlled frequency of 1030 megahertz; all transponder replies are received on a frequency of 1090 and are processed into video signals that are suitable for reply decoding, identification and display.

Figure 2:
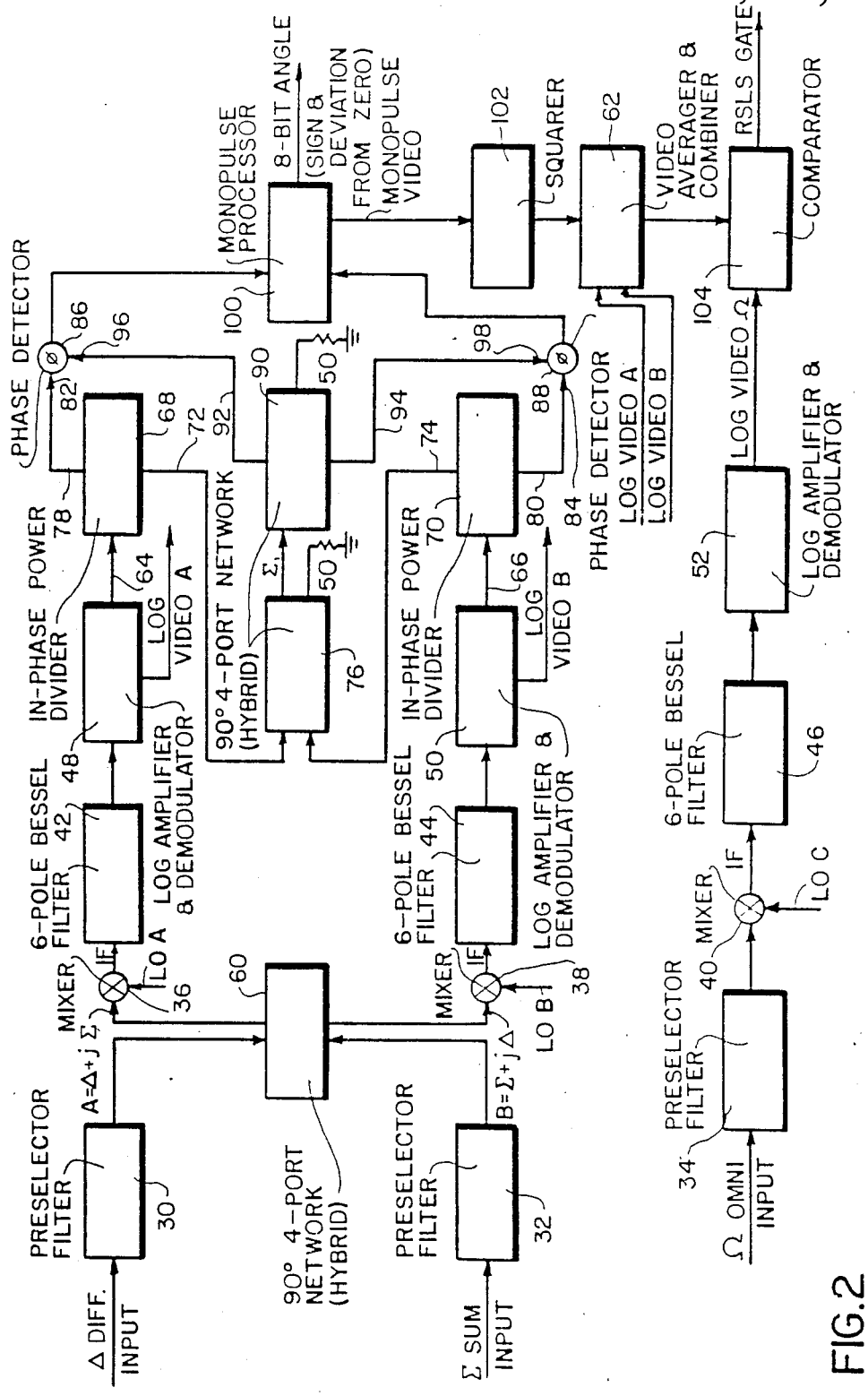
FIG. 2 is a block diagram of the unique secondary surveillance radar system of the present invention in which monopulse processing is used in the receiver to obtain angle estimation of azimuth bearing of aircraft based on replies from the aircraft.

The uniqueness of the present system may be appreciated by reference to FIG. 2 in which the detailed circuitry of the three channel receiver 16 and the video processor 18 of the present system will be seen. The monopulse receiver includes three separate channels. At the input to the upper channel there is provided a Difference ($\Delta$) input, to the next lower channel a Sum (Σ) input, and to the bottom channel an Omni (Ω) input which, as already explained, are provided from the secondary surveillance radar antenna.

Included in the three channels are preselector filters 30, 32, and 34 respectively, mixers 36, 38, and 40 respectively; 6-pole Bessel filters 42, 44, 46, respectively; and log amplifiers and demodulators 48, 50, and 52 respectively.

It will be understood that the three RF signals of the 1090 megahertz carrier frequency are made available to the respective receiver channels, Sum (Σ), Difference (Δ), and Omni (Ω). These modulated signals are processed by the preselector filters 30, 32, and 34 to enable transponder replies, but to suppress the 1030 megahertz interrogations. It will be seen that both the Sum (Σ) and Difference (Δ) signals received from the antenna are applied to the 90 degree four port network 60. The two resulting outputs are denominated A and B signals, being in the form $\Delta + j\Sigma$ and $\Sigma + j\Delta$ respectively, the absolute values of which are always equal. However, it will be recalled that, although these two signals will have the same magnitude, they will differ in phase depending on target deviation from boresight. A local oscillator, designated LO, has three isolated output signals of the same phase, designated A, B, and C which are applied to the respective mixers 36, 38, and 40 in the receiver channels to produce the converted, 60 megahertz, intermediate frequency (IF) signals.

The 6-pole Bessel filters 42, 44, and 46 are used for the IF bandpass function. Bessel-type filters are used because of their normally flat time delay response. The log amplifier and the demodulator devices in each of the channels is connected to the respective one of the Bessel filters. Each log amplifier has an overall gain of 72 dB, with the linear portion of the log's slope over at least 50 dB. Each log amplifier provides a log video signal which is supplied to the video averager and combiner device 62 seen on the far right in FIG. 2. These respective outputs are designated log video A for log amplifier 48 and log video B for log amplifier 50.

In addition to the log video output signals, limited carrier signals, that is amplitude limited, 60 megahertz IF, signals are supplied by way of the connections 64 and 66 at the other outputs of the respective amplifiers 48 and 50 to the in-phase power dividers 68 and 70 in the Difference (Δ) and Sum (Σ) channels.

Each signal to the in-phase power dividers 68 and 70 is split into two −3 dB signals in these power dividers: one −3 dB signal is furnished by way of a suitable output connections 72 and 74 to another 90 degree, four port network (hybrid) 76. The other −3 dB signals from the in-phase power dividers 68 and 70 are fed by way of the output connections 78 and 80 to inputs 82 and 84 of the respective phase detectors 86 and 88. The output of the network is fed or applied to another 90 degree, four port network 90, thereby to produce, at its outputs, two, phase-detection, reference signals, which are fed by way of output connections 92 and 94 to additional inputs 96 and 98 of phase detectors 86 and 88 respectively. Both of the quadrature hybrids, that is, the networks 76 and 90, have one of their ports terminated by a 50 ohm resistor.

It will be appreciated that the combination of the two phase detected signals A and B appearing at the respective outputs of the phase detectors 86 and 88 provides an accurate measure of angular deviation from boresight. Thus, both output signals are zero at bore-sight; A is positive and B negative, with deviations to the left of boresight; while A is negative but B positive with deviations to the right of boresight. Both the A and B signal levels are combined in the monopulse processor 100 to produce a single voltage level of positive or negative polarity, thereby providing the total value of deviation from boresight. This single voltage level is quantized into an 8-bit word, 7 bits for magnitude, and 1 bit for sign, and this quantized signal is taken from one of the outputs of the processor 100. Such digital format is made available to the angle processor of a plot extractor device (not shown).

Another output is provided from the monopulse processor 100 and this is designated "monopulse video", which is in analog format. This output signal is transmitted to a squarer 102 and the signal is squared; it is then applied to the device 62 previously mentioned. This latter device is a video averager and combiner, which as already noted, receives the output signals, log video A and log video B, from the respective log amplifiers 48 and 50.

The signals log video A and log video B are averaged in this device 62 (monopulse amplitude), corrected by monopulse video (monopulse phase). The resulting signal amplitude from the output of device 62 is then compared, by means of comparator 104, with the amplitude of the log video signal from the Omni (Ω) channel. For Omni (Ω) signal values that are larger than the combined average of the A and B signals minus the square of monopulse video, a receiver side lobe suppression, RSLS, gate signal is generated which inhibits target reports. For Omni values that are smaller, the RSLS remains at zero and the 8-bit angular deviation is processed by the circuitry that follows the monopulse receiver (not shown).

Figure 3:
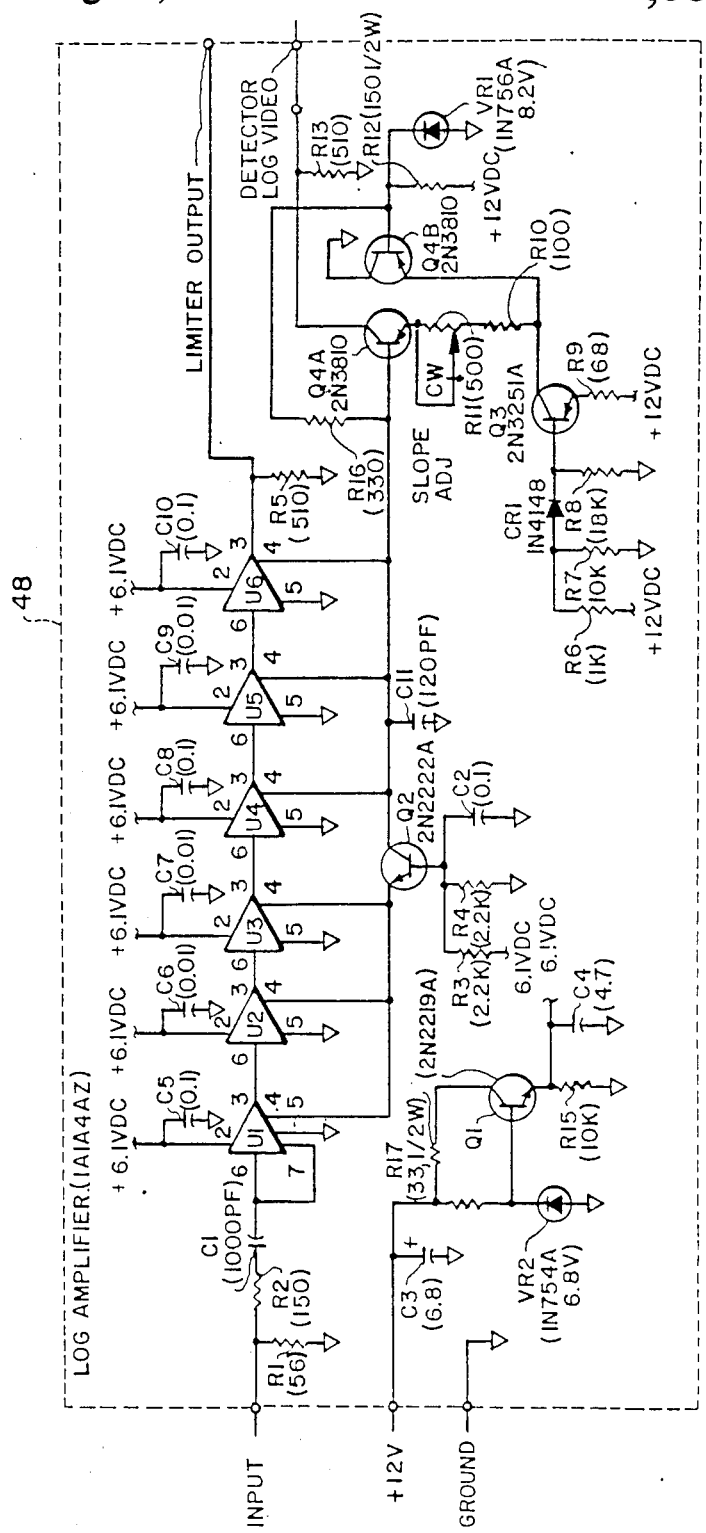
FIG. 3 is a schematic diagram of one of the log amplifiers that are utilized in the system of FIG. 2.

Referring now to FIG. 3, there will be seen a schematic diagram of one of the log amplifiers utilized in the system of FIG. 2. For convenience, this log amplifier is designated 48, being identical to the log amplifier 48 shown in FIG. 2. Moreover, the log amplifier 50 seen in FIG. 2 is also identical in all respects to the log amplifier 48, being provided with the same two output connections as log amplifier 48. Accordingly, both of these log amplifiers, as will be seen in FIG. 3, provide a limiter output and a detector log video output, the latter being designated log video A in the case of log amplifier 48, whereas it is designated log video B in the case of log amplifier 50. In both of these cases, the limiter outputs supply the carrier samples to the respective output connections 64 and 66 from the respective log amplifiers 48 and 50.

It will be understood that these log amplifiers per se are well known and they are provided with the typical terminals indicated on the left, that is, an input terminal, a power input terminal and ground. The log amplifier-detector (P/N 1A1A4AZ) depicted in FIG. 3, is made up of: six identical amplifier stages (U1 to U6), video currents summing, amplification, and detection stages (Q2), constant current generator (Q3), difference amplifier (Q4A and Q4B), and voltage regulator (Q1). The complete log amplifier receives IF converted signal, power, and ground, and provides 60 MHz IF limiter output, and detected log video.

Each of the amplifier stages (U1 to U6) provides a power gain of 12 dB for an overall gain of 72 dB. Whenever the input to an amplifier-detector stage is above a pre-determined threshold (the same threshold for each stage), the amplifier-detector generates a video current which is proportional to the logarithm of the input power applied to that stage. The log detected video currents from each stage are then summed (in Q2), to realize an overall log response. The sum of the log detected video current at Q2 generates a voltage signal across load resistor R16; this signal is further amplified by difference amplifier Q4A and Q4B, and a signal output (demodulated log video) is generated across load resistor R13.

This output is normally applied to a pulse-width restorer circuitry to reshape the pulses. It is to be noted that the pulse restorer is not a part of the log strip, and it is not depicted in FIG. 3.

The output from log amplifier strip (U1 to U6) is terminated into a resistive load, R5, and is made available as 60 MHz IF, limited, log output signal.

Voltage regulator Q1 and associated components, generate noise-free, stable, 6.1 volts DC for amplifier stages U1 to U6.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

We claim:

1. A secondary surveillance radar system in which one-half angle monopulse processing is used to obtain angle estimation of azimuth bearing, said system comprising:
    at least three channels, one of which is a sum channel, the second a difference channel, and the third an omni channel;
    means for providing first and second signals of equal magnitude, but differing in phase, in the respective sum and difference channels, the first signal being $\Sigma+j\Delta$, the second signal being $\Delta+j\Sigma$;
    a log amplifier in each of the respective channels;
    a monopulse processor;
    two independent phase detectors for detecting said first and second signals in the respective sum and difference channels;
    means for coupling the outputs of the respective phase detectors to said processor; and
    means for coupling the outputs of said log amplifiers in said sum and difference channels to their respective phase detectors, whereby a resultant signal is obtained the magnitude of which gives target deviation in either direction from boresight based on the phase difference between said first and second signals.

2. A system as defined in claim 1, in which said means for coupling the outputs of said log amplifiers in said sum and difference channels to said respective phase detectors includes at least one 90 degree, 4 port network, an output of each of said log amplifiers being coupled to respective inputs of said network, the output of said network being coupled to a respective input of each of said phase detectors.

3. A system as defined in claim 2, in which said means for coupling the outputs of said log amplifiers to the phase detectors further includes an in-phase power divider connected between each of said log amplifiers and said 4 port network, said divider also being connected between said log amplifiers and another respective input of each of said phase detectors.

4. A system as defined in claim 3, further including a squarer device connected to a first output of said monopulse processor;
    and a plot extractor connected to a second output of said monopulse processor.

5. A system as defined in claim 4, further comprising a video averager and combiner device, and in which the output of said squarer is connected to said video averager and combiner device.

6. A system as defined in claim 5, in which a log amplifier and a comparator are included in said third channel;
    and means for coupling the output of said video averager and the output of said log amplifier in said third channel to said comparator, the output of said comparator being coupled to produce a side lobe suppression signal.

* * * * *